(12) United States Patent
Payyoor et al.

(10) Patent No.: US 12,264,690 B2
(45) Date of Patent: Apr. 1, 2025

(54) DAMPING DEVICE FOR DAMPING SHAFT VIBRATION

(71) Applicant: General Electric Company, Schenectady, NY (US)

(72) Inventors: Narayanan Payyoor, Bangalore (IN); Peeyush Pankaj, Bangalore (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/618,118

(22) Filed: Mar. 27, 2024

(65) Prior Publication Data

US 2024/0240651 A1    Jul. 18, 2024

Related U.S. Application Data

(63) Continuation of application No. 17/073,863, filed on Oct. 19, 2020, now Pat. No. 11,971,054.

(51) Int. Cl.
| | |
|---|---|
| *F04D 29/66* | (2006.01) |
| *F01D 25/16* | (2006.01) |
| *F04D 29/053* | (2006.01) |
| *F04D 29/059* | (2006.01) |
| *F16C 19/52* | (2006.01) |
| *F16C 27/04* | (2006.01) |

(Continued)

(52) U.S. Cl.
CPC ......... *F04D 29/668* (2013.01); *F01D 25/164* (2013.01); *F04D 29/053* (2013.01); *F04D 29/059* (2013.01); *F16C 19/527* (2013.01); *F16C 27/045* (2013.01); *F16C 35/07* (2013.01); *F16C 35/077* (2013.01); *F05D 2250/36* (2013.01); *F05D 2260/96* (2013.01); *F16C 2360/23* (2013.01)

(58) Field of Classification Search
CPC .... F04D 29/053; F04D 29/059; F04D 29/668; F16C 35/077; F16C 2360/23; F16C 19/527; F16C 27/045; F05D 2250/36; F05D 2260/96; F01D 5/10; F01D 25/164

See application file for complete search history.

(56) References Cited

U.S. PATENT DOCUMENTS

| | | |
|---|---|---|
| 3,456,992 A | 7/1969 | Kulina |
| 3,639,014 A | 2/1972 | Sixsmith |

(Continued)

*Primary Examiner* — Topaz L. Elliott
*Assistant Examiner* — Andrew J Marien
(74) *Attorney, Agent, or Firm* — Dority & Manning, P.A.

(57) ABSTRACT

Damping devices, turbomachines, and methods of damping vibration are provided. For example, a damping device for damping vibration of a shaft rotatable about an axis of rotation is provided. The damping device defines radial and axial directions. The damping device comprises a bearing, a housing, and a damper element. The housing and damper element define a cavity therebetween for receipt of a damping fluid. The cavity has a length along the axial direction that is curved away from the axis of rotation. As another example, a turbomachine comprising a shaft rotatable about an axis of rotation includes a damping device positioned annularly about the shaft. The damping device comprises a housing and a damper element defining a cavity therebetween for receipt of a damping fluid that has a curved shape. The cavity is curved in a plane extending along the radial and axial directions and including the axis of rotation.

19 Claims, 5 Drawing Sheets

(51) Int. Cl.
*F16C 35/07* (2006.01)
*F16C 35/077* (2006.01)

(56) References Cited

U.S. PATENT DOCUMENTS

| | | | |
|---|---|---|---|
| 4,492,245 A | 1/1985 | Sjolund | |
| 4,867,655 A * | 9/1989 | Barbic | F16C 27/045 |
| | | | 384/535 |
| 4,952,076 A | 8/1990 | Wiley, III et al. | |
| 4,971,458 A | 11/1990 | Carlson | |
| 5,044,781 A | 9/1991 | Werner | |
| 5,071,262 A | 12/1991 | Monzel et al. | |
| 5,316,391 A | 5/1994 | Monzel | |
| 5,344,239 A | 9/1994 | Stallone et al. | |
| 6,135,639 A | 10/2000 | Dede | |
| 6,325,546 B1 | 12/2001 | Storace | |
| 6,695,478 B2 | 2/2004 | Bos et al. | |
| 6,872,003 B2 | 3/2005 | Dusserre-Telmon et al. | |
| 7,217,039 B2 * | 5/2007 | Baudelocque | F16C 32/0442 |
| | | | 384/624 |
| 7,517,152 B1 | 4/2009 | Walsh | |
| 7,574,854 B2 | 8/2009 | Moniz | |
| 7,707,983 B2 | 5/2010 | Ueno et al. | |
| 7,731,426 B2 | 6/2010 | Meacham et al. | |
| 8,083,413 B2 | 12/2011 | Ertas | |
| 8,167,494 B2 | 5/2012 | Gibbons | |
| 8,206,039 B2 | 6/2012 | Maier | |
| 8,439,637 B2 | 5/2013 | DiBenedetto et al. | |
| 8,529,197 B1 | 9/2013 | Coffin et al. | |
| 8,591,117 B2 * | 11/2013 | Giraud | F16C 27/066 |
| | | | 384/535 |
| 9,121,448 B2 | 9/2015 | Delgado Marquez et al. | |
| 9,739,170 B2 | 8/2017 | Ertas | |
| 9,890,810 B2 | 2/2018 | Kawashita et al. | |
| 9,926,975 B2 | 3/2018 | Smedresman et al. | |
| 9,951,817 B2 | 4/2018 | Meyers | |
| 9,988,976 B2 | 6/2018 | Kocher | |
| 10,132,351 B2 * | 11/2018 | Takaoka | F16C 19/06 |
| 10,900,379 B2 | 1/2021 | Gysling et al. | |
| 10,941,849 B2 * | 3/2021 | Hasting | F16H 57/082 |
| 11,542,835 B2 | 1/2023 | Smedresman et al. | |
| 2007/0086685 A1 | 4/2007 | Klusman et al. | |
| 2011/0049109 A1 | 3/2011 | Weeber et al. | |
| 2013/0051982 A1 | 2/2013 | Hindle et al. | |
| 2017/0023021 A1 | 1/2017 | Ogata et al. | |
| 2017/0276173 A1 | 9/2017 | Smedresman et al. | |
| 2017/0298752 A1 | 10/2017 | Mook et al. | |
| 2018/0245632 A1 | 8/2018 | Obara et al. | |
| 2019/0071998 A1 | 3/2019 | Gysling et al. | |
| 2020/0018350 A1 | 1/2020 | Weiner | |
| 2020/0056677 A1 | 2/2020 | Schmidt et al. | |
| 2020/0080445 A1 | 3/2020 | Gysling et al. | |

* cited by examiner

FIG. -4-
PIROR ART

DAMPING DEVICE FOR DAMPING SHAFT VIBRATION

CROSS-REFERENCE TO RELATED APPLICATIONS

The present application is a continuation of and claims priority to U.S. application Ser. No. 17/073,863 entitled "DAMPING DEVICE FOR DAMPING SHAFT VIBRATION", filed Oct. 19, 2020, the entire disclosure of which is hereby expressly incorporated by reference herein.

FIELD

The present subject matter relates generally to damping devices for damping shaft vibration.

BACKGROUND

Many turbine engines contain squeeze film damper (SFD) devices that dampen radial vibration caused by the relative radial motion between the rotor and support structure. SFDs are typically mounted around one or more of the rotor bearings and have cylindrical fluid film that is exercised under radial loads from the bearings. Thus, axial damping is usually preformed independently of radial damping, requiring larger or additional dampers for effective axial, radial, and rotational damping. Moreover, typical dampers may provide ineffective damping in the axial and rotational directions, which may lead to rotor instability, degraded engine performance, and damage to components. Accordingly, a damping device that addresses one or more of the challenges noted above would be useful. In particular, a damping device that includes, in a single device, features for damping rotor vibration of turbomachines in the radial, axial, and rotational directions would be desirable.

BRIEF DESCRIPTION

Aspects and advantages of the invention will be set forth in part in the following description, or may be obvious from the description, or may be learned through practice of the invention.

In one exemplary embodiment of the present subject matter, a turbomachine is provided. The turbomachine comprises a shaft rotatable about an axis of rotation and a damping device positioned annularly about the shaft. The damping device defines a radial direction and an axial direction; the axial direction is parallel to the axis of rotation. The damping device comprises a bearing operatively coupled with the shaft, a housing, and a damper element. The housing and the damper element define a cavity therebetween for receipt of a damping fluid. The cavity has a curved shape. The shaft extends longitudinally along the axial direction, and the cavity is curved in a plane extending along the radial direction and the axial direction and including the axis of rotation.

In another exemplary embodiment of the present subject matter, a damping device for damping vibration of a shaft rotatable about an axis of rotation is provided. The damping device defines a radial direction and an axial direction; the axial direction is parallel to the axis of rotation. The damping device comprises a bearing, a housing, and a damper element. The housing and the damper element define a cavity therebetween for receipt of a damping fluid. The cavity has a length along the axial direction, and the length of the cavity is curved away from the axis of rotation.

In a further exemplary embodiment of the present subject matter, a method of damping vibration of a shaft is provided. The method comprises rotating the shaft about an axis of rotation; damping, via a damping device, axial vibration of the shaft; and damping, via the damping device, overturning moment of the shaft. The damping device defines a radial direction and an axial direction. The axial direction is parallel to the axis of rotation such that the shaft extends longitudinally along the axial direction. The damping device comprises a bearing operatively coupled with the shaft, a housing, and a damper element. The housing and the damper element define a cavity therebetween for receipt of a damping fluid. The cavity has a curved shape and is curved in a plane extending along the radial direction and the axial direction and including the axis of rotation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. The terms "coupled," "fixed," "attached to," and the like refer to both direct coupling, fixing, or attaching, as well as indirect coupling, fixing, or attaching through one or more intermediate components or features, unless otherwise specified herein. The singular forms "a," "an," and "the" include plural references unless the context clearly dictates otherwise.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine exhaust, or a component being relatively closer to the engine exhaust as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter is directed to damping devices for damping shaft vibration. More particularly, the present subject matter is directed to a damping device for damping vibration of a shaft rotatable about an axis of rotation, where the damping device comprises a cavity for receipt of a damping fluid such that a fluid film formed by the damping fluid is non-cylindrical. For instance, the cavity is curved in a plane extending along a radial direction and an axial direction defined by the damping device and including the axis of rotation. Further, the cavity may have a length extending parallel to the axis of rotation, and the cavity may be curved such that the length curves away from the axis of rotation. The curved fluid film produced by the curved cavity of the damping device may provide moment or rotational damping, as well as radial and axial damping. Turbomachines including such damping devices and methods of damping shaft vibration also are provided.

Figure 1:
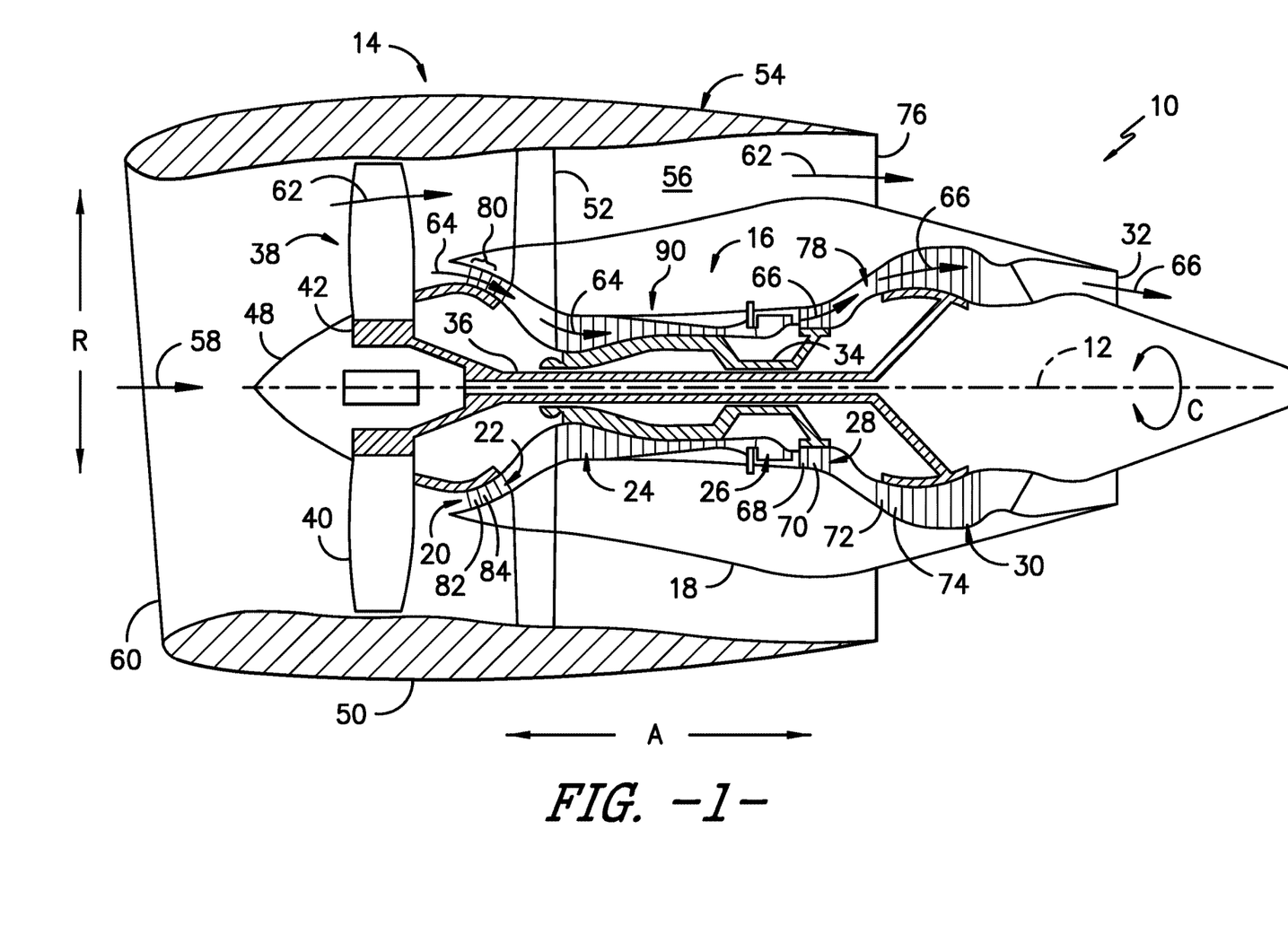
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a circumferential direction C (extending about the longitudinal centerline 12 and the axial direction A), and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk or hub 42 in a spaced apart manner. As depicted, fan blades 40 extend outward from disk 42 generally along the radial direction R. The fan blades 40 and disk 42 are together rotatable about the longitudinal centerline 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, the disk 42 is covered by a rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52. Moreover, a downstream section 54 of the fan case 50 may extend over an outer portion of the core turbine engine 16 so as to define a bypass airflow passage 56 therebetween.

During operation of the turbofan engine 10, a volume of air 58 enters turbofan 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the compressor section and into the combustion section 26, where it is mixed with fuel and burned to provide combustion gases 66. More particularly, the compressor section includes the LP compressor 22 and the HP compressor 24 that each may comprise a plurality of compressor stages 80, with each stage 80 including both an annular array or circumferential row of stationary compressor vanes 82 (also referred to as compressor stator vanes 82) and an annular array or circumferential row of rotating compressor blades 84 (also referred to as compressor rotor blades 84) positioned immediately downstream of the compressor vanes 82. The plurality of compressor blades 84 in the LP compressor 22 are coupled to the LP shaft or spool 36, and the plurality of compressor blades in the HP compressor 24 are coupled to the HP shaft or spool 34. The plurality of compressor vanes 82 in the LP compressor 22 are coupled to a compressor casing, and the plurality of compressor vanes 82 in the HP compressor 24 are coupled to a compressor casing; at least a portion of the HP compressor vanes 82 are coupled to compressor casing 90. In some embodiments, the compressor casing 90 may extend through both the LP compressor 22 and the HP compressor 24 and support all of the compressor vanes 82. In other embodiments, the compressor casing 90 supports only a portion of the compressor vanes 82 and may support only a portion of the compressor vanes 82 in the HP compressor 24. As previously described, as the second portion of air 64 passes through the sequential stages of compressor vanes 82 and blades 84, the volume of air 64 is pressurized, i.e., the pressure of the air 64 is increased prior to combustion with fuel in the combustion section 26 to form the combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Although the gas turbine engine of FIG. 1 is depicted in a turboshaft configuration, it will be appreciated that the teachings of the present disclosure can apply to other types of turbine engines, turbomachines more generally, and other shaft systems. For example, the turbine engine may be another suitable type of gas turbine engine, such as e.g., a turboprop, turbojet, turbofan, aeroderivatives, etc. The present disclosure is also applicable to other types of turbomachinery, such as e.g., steam turbine engines and centrifugal pumps. The present disclosure is further applicable to other types of shaft systems, such as e.g., a tail rotor drive shaft of a rotary vehicle, such as e.g., a helicopter.

Figure 2:
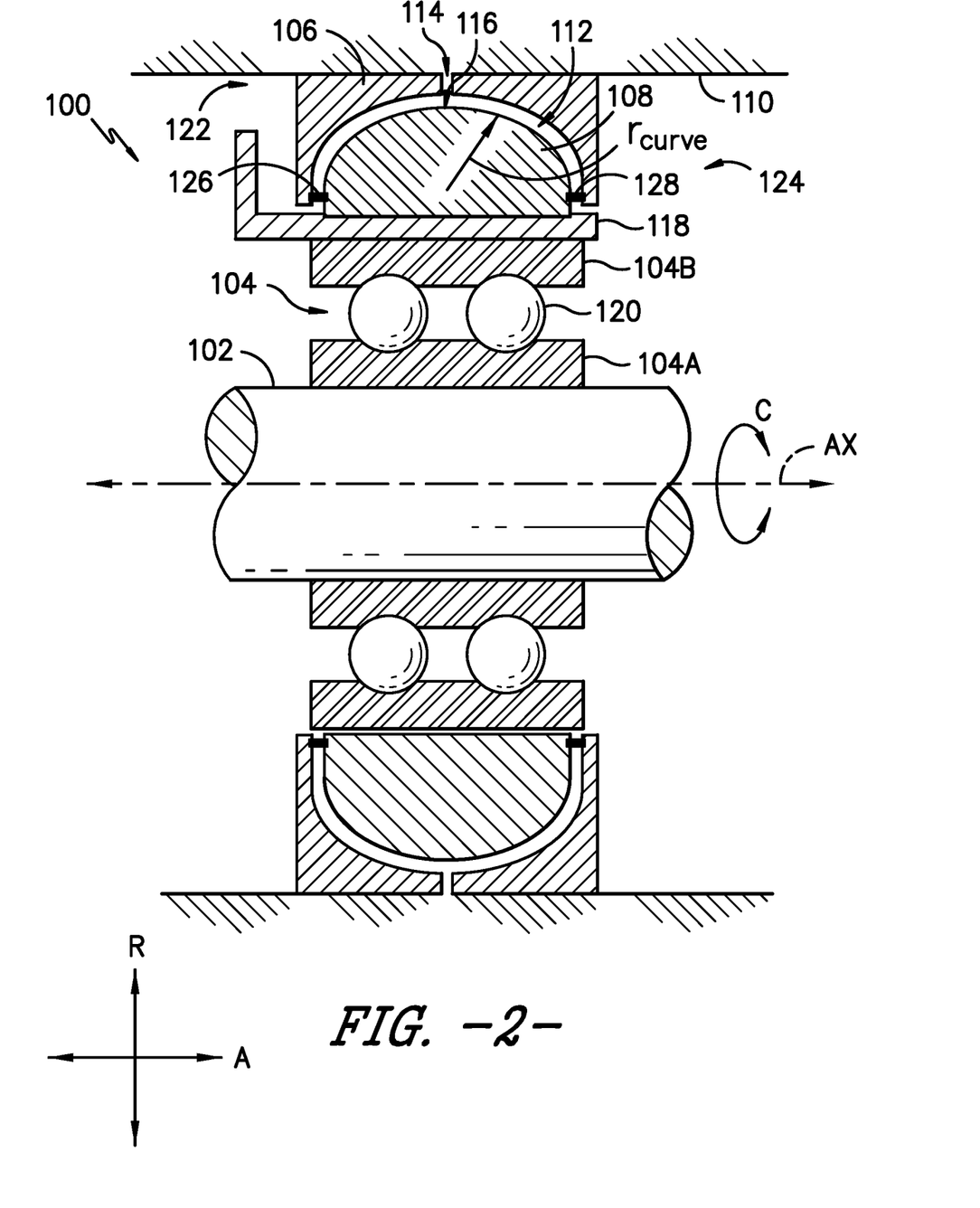
FIG. 2 provides a cross-section view of a damping device, according to an exemplary embodiment of the present subject matter.
Figure 3:
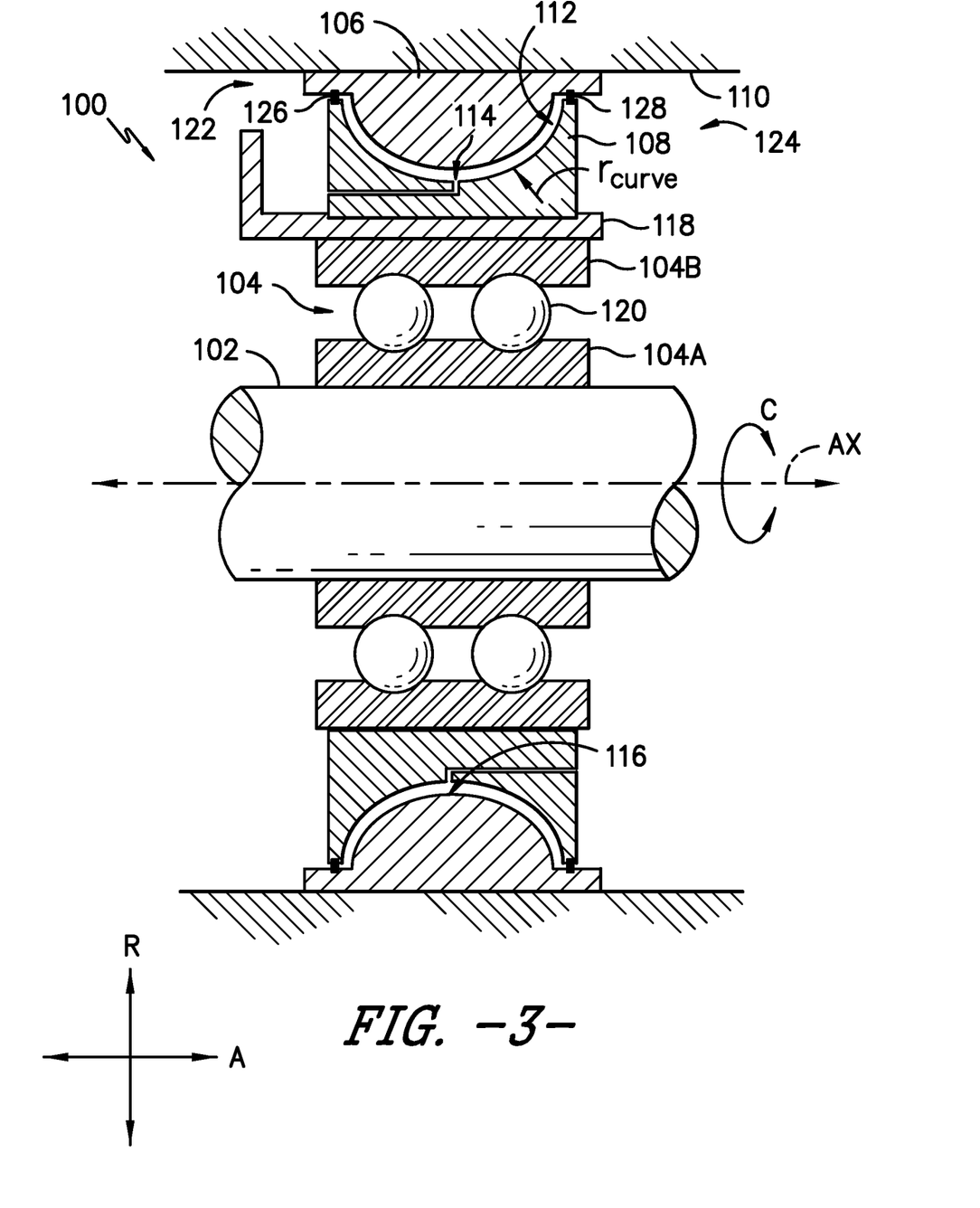
FIG. 3 provides a cross-section view of a damping device, according to another exemplary embodiment of the present subject matter.

FIG. 2 provides a schematic cross-sectional view of a damping device 100 in accordance with an exemplary embodiment of the present subject matter. FIG. 3 provides a schematic cross-sectional view of the damping device 100 in accordance with another exemplary embodiment of the present subject matter. The damping device 100 of FIGS. 2 and 3 can be used for damping shaft vibration of one or more shafts of any suitable turbomachine, drive system, or any suitable shaft system. As one example, the damping device 100 may be operatively configured to damp the shaft vibration of one or more of the shafts of the gas turbine engine 10 of FIG. 1. As another example, the damping device 100 may be operatively configured to damp shaft vibration of a drive shaft of a transmission system, such as e.g., a tail rotor drive shaft of a rotary aerial vehicle. As still another example, the damping device 100 may be operatively configured to damp shaft vibration of a counter-rotating, vaneless gas turbine engine, i.e., a gas turbine engine having, rather than axially spaced annular arrays of stator vanes, a counter-rotating outer drum to which blades are attached that are interdigitated with the blades of an inner rotor. Other applications are possible.

As shown in each of FIGS. 2 and 3, the damping device 100 defines an axial direction A, a radial direction R, and a circumferential direction C, which, in exemplary embodiments, correspond with the axial, radial, and circumferential directions A, R, C of the engine 10. A shaft 102 extends through the damping device 100 such that the damping device 100 is positioned annularly about the shaft 102. Further, the shaft 102 extends longitudinally along the axial direction A and is rotatable about an axis of rotation AX. The axial direction A extends parallel with the axis of rotation AX, the radial direction R extends to and from the axis of rotation AX in a direction orthogonal to the axial direction A, and the circumferential direction C extends three hundred sixty degrees (360°) about the axis of rotation AX. In embodiments in which the damping device 100 is utilized in a turbomachine such as engine 10, the axis of rotation AX may be the centerline axis 12 of the engine 10 or may otherwise be parallel to the engine centerline axis.

As further illustrated in FIGS. 2 and 3, each exemplary damping device 100 comprises a bearing 104 operatively coupled with the shaft 102, a housing 106, and a damper element 108. The housing 106 and the damper element 108 are positioned between a support structure 110 and the bearing 104, e.g., along the radial direction R. More specifically, each of the housing 106 and the damper element 108 extends annularly about or circumferentially surrounds the shaft 102 and the bearing 104, with the housing also extending annularly about or circumferentially surrounding the damper element 108. The support structure 110 may be any suitable structure, such as e.g., a strut or a casing.

Figure 5:
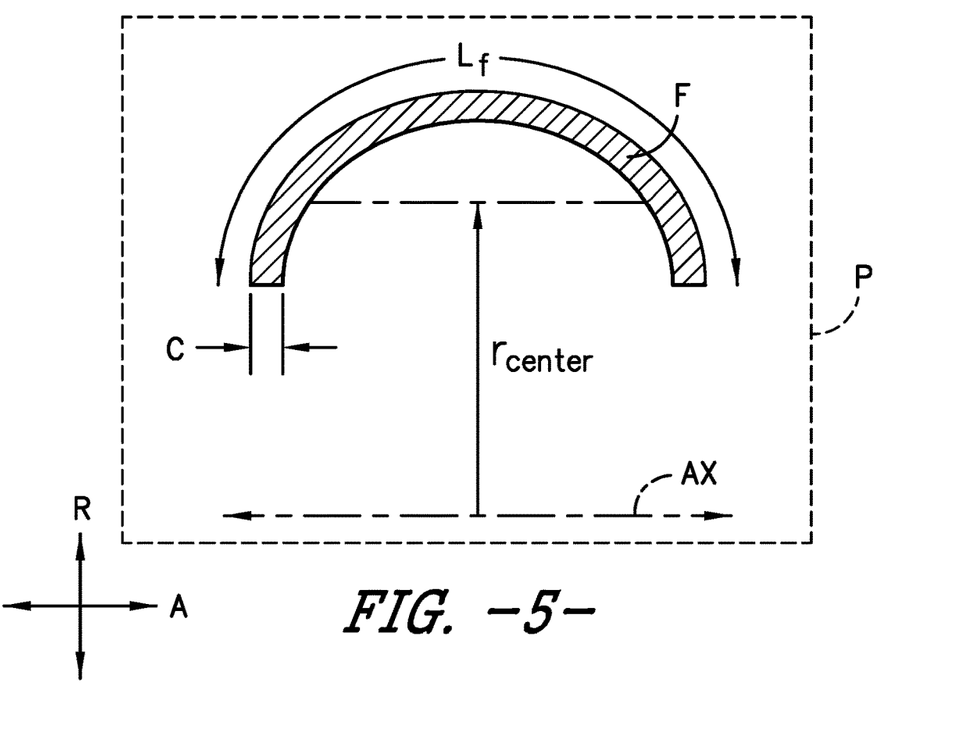
FIG. 5 provides a schematic cross-section view of a damping fluid film of the present subject matter, which is curved in the plane defined by the radial and axial directions and including the axis of rotation of a shaft damped by the damping fluid film.

Keeping with FIGS. 2 and 3, the housing 106 and the damper element 108 of each exemplary damping device 100 define a cavity 112 therebetween for receipt of a damping fluid F (FIG. 5). The cavity 112 has a curved shape. More particularly, each of the housing 106 and the damper element 108 are curved in complementary directions to define the curved shape of the cavity 112. In the exemplary embodiment of FIG. 2, the damper element 108 curves away from the axis of rotation AX such that the damper element 108 has a convex curved shape. In the exemplary embodiment of FIG. 3, the damper element 108 curves toward the axis of rotation AX such that the damper element 108 has a concave curved shape. In each illustrated exemplary embodiment, the cavity 112 is curved in a plane P extending along the radial direction R and the axial direction A and including the axis of rotation AX. Further, in each of these exemplary embodiments, the cross-section of the curved shape is a semi-circle, but other cross-sectional and curved shapes may be used as well to define a non-rectilinear fluid film parallel to the axis of rotation.

As shown in FIG. 5, when the damping fluid F is received in the cavity 112, the damping fluid F provides a fluid film for damping shaft vibrations that has the curved shape of the cavity 112. Moreover, the fluid film formed by the damping fluid F has a fluid film length $L_f$ extending along the axial direction A or parallel to the axis of rotation AX. As shown in FIG. 5, the length $L_f$ is measured along a perimeter of the curved shape from a first location (1) to a second location (2), where the second location (2) is spaced apart from the first location (1) along the axial direction A. As illustrated in FIGS. 2, 3, and 5, the length $L_f$ of the cavity 112 and the film of damping fluid F is curved away from the axis of rotation AX.

Further, the cavity 112 and the film of damping fluid F have a radius of curvature $r_{curve}$, and the fluid film length $L_f$ may be a function of the radius of curvature $r_{curve}$. For instance, for the fluid film having a semi-circle shaped cross-section as shown in FIGS. 2, 3, and 5, the length $L_f$ is the perimeter or arc length of a semi-circle:

$$L_f = \pi r_{curve}$$

The radius or average radius of the fluid film and the length $L_f$ of the fluid film determine a contact surface area of the film of damping fluid F. Comparing FIG. 4, which illustrates a known or prior art fluid film that is rectilinear in the plane P and has a film thickness c, with FIG. 5, which illustrates a curved fluid film of the present subject matter that also has a film thickness c, the curved fluid film has a greater contact surface area than the rectilinear fluid film of the prior art. More particularly, the rectilinear fluid film, with an axial length $L_{art}$, has a contact surface area that is less than the contact surface area of the curved fluid film, which is determined by the radius of curvature $r_{curve}$ and the length $L_f$ of the curved film of damping fluid F. Thus, the prior art rectilinear fluid film provides less damping than the curved fluid film of the present subject matter. As such, a smaller damping device 100 may be used to provide damping equivalent to prior art dampers such as illustrated in FIG. 4, which may promote more compact dampers.

Further, the amount of damping provided by the curved fluid film may vary among exemplary damping devices 100, e.g., by varying the radius of curvature $r_{curve}$ of the damping devices 100. More specifically, the amount of curvature is proportional to amount of damping, such that a first damping device 100 having a damping fluid film with a radius of curvature $r_{curve}$ that is larger than a radius of curvature recurve of a damping fluid film of a second damping device 100 provides greater damping than the second damping device 100. Accordingly, damping devices 100 with larger radii of curvature $r_{curve}$ provide greater or more damping than damping devices 100 with smaller radii of curvature $r_{curve}$, and inversely, damping devices 100 with smaller radii of curvature $r_{curve}$ provide less damping than damping devices 100 with larger radii of curvature $r_{curve}$.

Figure 4:
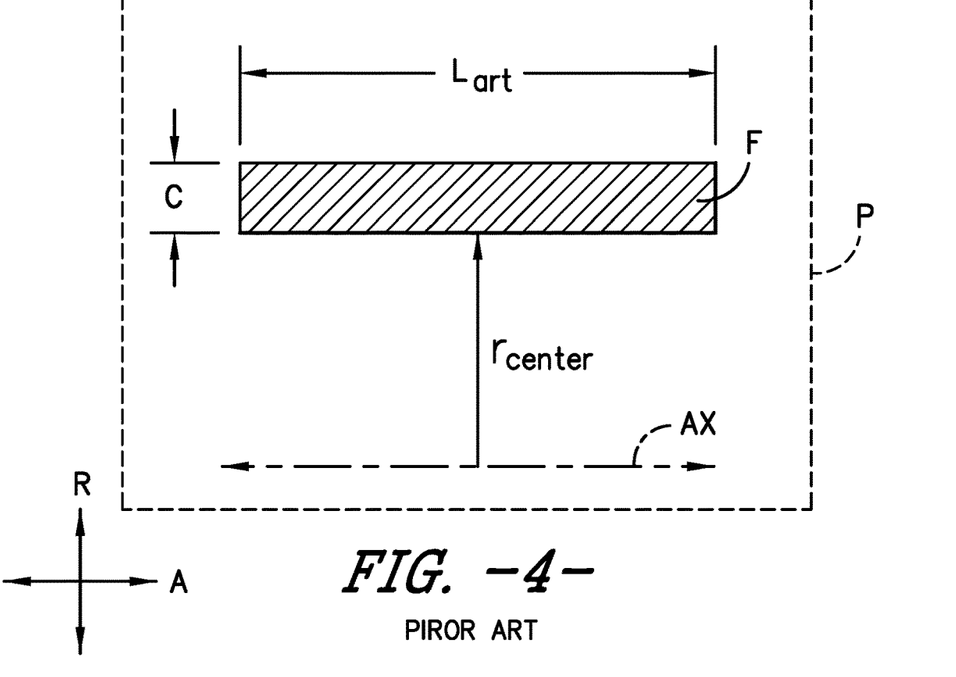
FIG. 4 provides a schematic cross-section view of a damping fluid film of the prior art, which is rectilinear in a plane defined by the radial and axial directions and including the axis of rotation of a shaft damped by the damping fluid film.

As further illustrated in FIG. 4, a geometric center of the prior art rectilinear fluid film is defined at a radial distance or radius $r_{center}$ from the axis of rotation AX, which may be the engine centerline axis (e.g., centerline axis 12) for embodiments in which the damping device 100 is used in a turbomachine such as engine 10. As depicted in FIG. 5, a geometric center of the curved fluid film is defined at a radial distance or radius $r_{center}$ from the axis of rotation AX. As shown through a comparison of FIGS. 4 and 5, the curved fluid film of the present subject matter intersects the radius $r_{center}$ drawn to the geometric center of the curved film at two locations that are spaced apart from one another along the axial direction A. In contrast, the rectilinear fluid film intersects the radius $r_{center}$ drawn to the geometric center of the rectilinear film along the entire axial length $L_{art}$ of the rectilinear fluid film.

It will be appreciated that the prior art fluid film is referred to as "rectilinear" because it has a rectilinear cross-section in the plane P that extends along the radial direction R and the axial direction A and includes the axis of rotation AX. Further, the prior art fluid film is cylindrical, extending longitudinally parallel to the axis of rotation AX such that the prior art fluid film circumferentially surrounds the axis of rotation AX. As described herein, the damping device 100 produces a curved fluid film that has a curved (e.g., semi-circular) cross-sectional shape in the plane P and is non-cylindrical.

It will be appreciated that, in embodiments in which the curved shape is a semi-circle, each of an upper and lower cross-section of the fluid cavity 112 and damping fluid film is a semi-circle. It will be appreciated that FIG. 5 illustrates the upper cross-section of the damping fluid-filled cavity 112 of FIG. 2. That is, referring to the cross-sectional view of FIG. 2, an upper cross-section of the damping device 100 is shown above the axis of rotation AX and a lower cross-section of the damping device 100 is shown below the axis of rotation AX, where "above" and "below" the axis of rotation refer to relative vertical positions with respect to the page. In other embodiments, the cavity 112 may have other curved shapes.

Further, referring to FIGS. 2 and 3, the upper portion of the damping device 100 works against the lower portion of the damping device 100. As a result, the film of damping fluid F is squeezed in opposite directions, providing axial damping. Additionally, because the damping fluid film is curved, it is squeezed in both the axial and radial directions A, R, which provides overturning moment (OTM) damping. Thus, unlike conventional dampers that provide only radial damping or only axial, the damping device 100 provides axial and moment damping; moment damping also may be referred to as rotational damping. Such axial and moment damping can be particularly useful for bearing arrangements that can take moment loads. Moreover, the damping device 100 described herein is a radial and axial cross-coupled damper, which improves stability margin by providing additional stator damping apart from the radial degree of freedom.

As further illustrated in FIGS. 2 and 3, the damping device 100 defines a fluid inlet 114 for the ingress of the damping fluid F into the cavity 112. It will be appreciated that the semi-circular cross-sectional shape of the cavity 112 in each of FIGS. 2 and 3 also may be described as a parabola or a parabolic shape, such that the cavity 112 has a vertex 116, the point through which passes the axis of symmetry of the parabola. As shown in FIG. 2, for a convex parabola-shaped cavity 112, the fluid inlet 114 may be defined radially outward of the vertex 116. As depicted in FIG. 3, for a concave parabola-shaped cavity 112, the fluid inlet 114 is defined radially inward of the vertex 116. It will be understood that the damping device 100 may further define a fluid outlet (not shown) for the egress of the damping fluid F from the cavity 112. For instance, during operation, the damping fluid F may be circulated though the cavity 112 via a circulation system, e.g., to introduce relatively cool damping fluid to the cavity 112 and to remove relatively hot damping fluid From the cavity 112. The relatively cool damping fluid F may enter the cavity 112 through the fluid inlet 114 and may exit the cavity 112 though the fluid outlet.

In exemplary embodiments, the damping device 100 further comprises a support arm 118 for uniform distribution of the damping fluid F within the cavity 112. More particularly, the support arm 118 helps position the damping device 100 with respect to the shaft 102 to provide a uniform film of the damping fluid F along the circumference of the damper element 108. A centering spring or other biasing mechanism may be used with the support arm 118 to adjust the position of the damping device 100 and thereby control the uniformity of the damping fluid Film.

Keeping with FIGS. 2 and 3, the bearing 104 comprises an inner race 104A and an outer race 104B. As shown in the depicted exemplary embodiments, the support arm 118 may be disposed between the damper element 108 and the outer race 104B of the bearing 104. Further, the inner race 104A may be coupled to the shaft 102, and the outer race 104B may be coupled to the damper element 108.

In exemplary embodiments, the bearing 104 is a duplex roller element bearing, having two rows of roller elements 120. In other embodiments, the bearing 104 may be a single roller element bearing, having a single row of roller elements 120, or the bearing 104 may have any other number of rows of roller elements 120. Moreover, the roller elements 120 may be balls, such that the bearing 104 is a ball roller bearing; taper rollers, such that the bearing 104 is a taper roller bearing; or any other suitable roller elements.

As further illustrated in FIGS. 2 and 3, the damping device 100 has an first end 122 and a second end 124. In exemplary embodiments, the damping device 100 comprises a first end seal 126 on the first end 122 between the housing 106 and the bearing 104 and a second end seal 128 on the second end 124 between the housing 106 and the bearing 104. That is, the end seals 126, 128 are configured to prevent leakage of the damping fluid F from the damping device 100, with the first end seal 126 sealing the cavity 112 on the first end 122 of the damping device 100 and the second end seal 128 sealing the cavity 112 on the second end 124 of the damping device 100, the second end 124 being axially opposite the first end 122.

Figure 6:
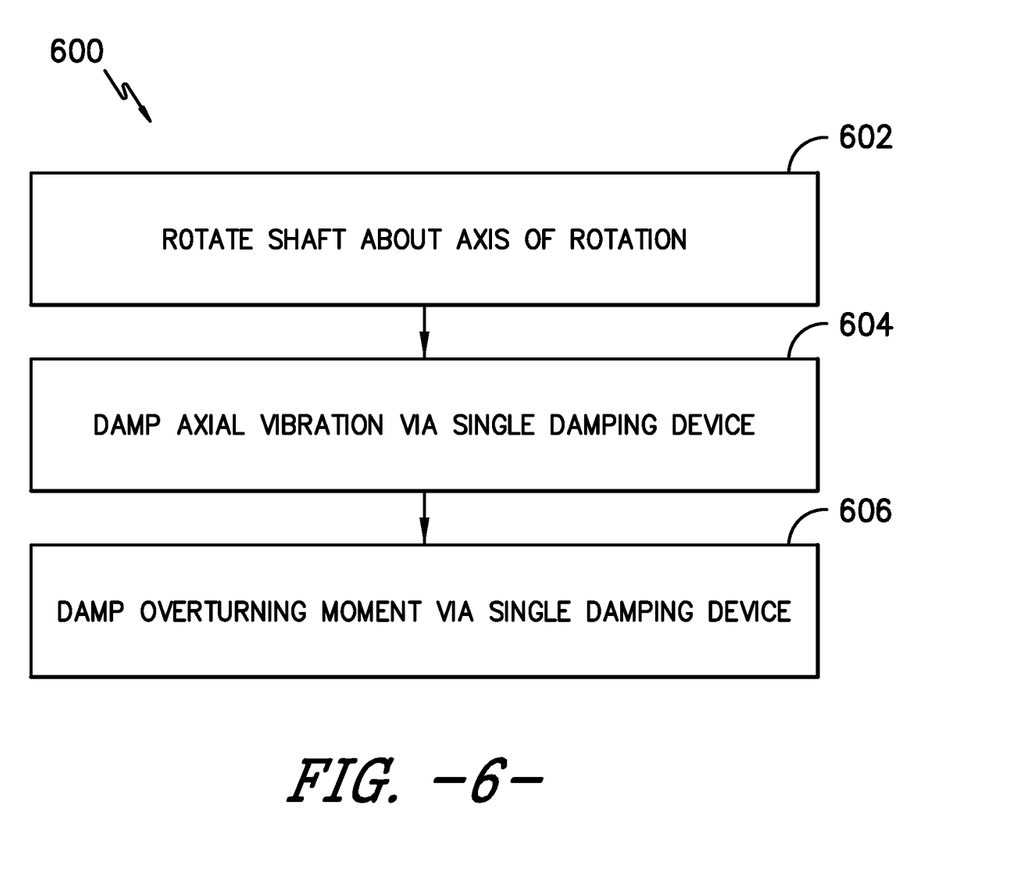
FIG. 6 provides a flow diagram illustrating a method of damping vibration of a shaft, according to an exemplary embodiment of the present subject matter.

The present subject matter also provides various damping methods, e.g., methods of damping a moment on a shaft. Referring now to FIG. 6, an exemplary method 600 of damping vibration on a shaft, such as shaft 102, is illustrated. The exemplary method 600 includes at 602 rotating the shaft 102 about an axis of rotation AX. The exemplary method 600 further includes at 604 and 606, respectively, damping, via a damping device 100, axial vibration of the shaft 102 and damping, via the damping device 100, overturning moment of the shaft 102. Thus, both axial and moment (or rotational) damping is provided via a single damping device 100.

As described herein, the damping device 100 provides a non-cylindrical damping fluid film that is curved in a plane P extending along a radial direction R and an axial direction A defined by the damping device 100 and including an axis of rotation of the shaft 102 whose vibrations are damped by the damping device 100. More particularly, the damping device 100 comprises a housing 106 and a damper element 108 that are complementarily curved to define a curved cavity 112 therebetween in which the damping fluid F is received. The housing 106 and damper element 108 each circumferentially surround a bearing 104 that is operatively coupled to the shaft 102; the damper element 108 is coupled to the bearing 104. Thus, the shaft vibration and damping provided by the damping fluid F are transferred through the bearing 104. As described herein, the non-cylindrical nature of the damping fluid film provides damping in more than one degree of freedom, i.e., damping of axial and moment or bending vibrations (e.g., by allowing axial and radial squeezing of the curved fluid film, which leads to overturning moment (OTM) damping), unlike conventional cylindrical damping fluid film that provides damping in only one degree of freedom.

Accordingly, the present subject matter is directed to damping devices that, in a single device, provide damping in the radial, axial, and rotational directions. More particularly, the damping devices described herein provide non-cylindrical fluid film between the inner and outer race of a bearing, which provides radial and axial damping, as well as moment damping when required. As described herein, providing radial and axial damping within the same damper allows cross-coupled damping, which provides overturning moment (OTM) damping on a rotor supported by the bearing. For instance, the damper devices described herein allow bending or axial and radial squeezing of the damping fluid supply, which leads to overturning moment damping. Thus, the fluid film provides additional stator damping (rotational and axial damping), which improves stability of the rotor, as additional stator damping apart from the radial direction helps in improving stability margin. Further, compared to the linear fluid film of conventional dampers, the circumferential or curved fluid film provided by a damper of the present subject matter has a greater effective length and a greater average film radius, which increases damping within the same geometry (i.e., the inventive damper increases damping compared to a conventional damper of the same size). Accordingly, the damping devices described herein may have a compact design compared to conventional dampers (i.e., the damper size may be reduced without a reduction in damping performance) while providing benefits such as OTM damping and improved stability. A more compact damper may be useful for certain applications, such as counter-rotating gas turbine engines. Moreover, the present subject matter allows reduced vibrations, reduced loads, and saves weight/cost for gas turbine engines in which such dampers are installed because smaller and/or fewer dampers can be used without compromising damping performance. Reduced engine weight for aviation engines helps the aircraft to save fuel, i.e., the aircraft has a reduced fuel consumption. Other benefits and advantages of the present subject matter may be realized as well.

Further aspects of the invention are provided by the subject matter of the following clauses:

1. A turbomachine comprising a shaft rotatable about an axis of rotation; and a damping device positioned annularly about the shaft, the damping device defining a radial direction and an axial direction, the axial direction parallel to the axis of rotation, the damping device comprising a bearing operatively coupled with the shaft, a housing, and a damper element, the housing and the damper element defining a cavity therebetween for receipt of a damping fluid, the cavity having a curved shape, wherein the shaft extends longitudinally along the axial direction, and wherein the cavity is curved in a plane extending along the radial direction and the axial direction and including the axis of rotation.

2. The turbomachine of any preceding clause, wherein a cross-section of the curved shape has a radius of curvature, and wherein the cross-section of the curved shape has a length that is a function of the radius of curvature, the length measured along the curved shape from a first location to a second location, the second location spaced apart from the first location along the axial direction.

3. The turbomachine of any preceding clause, wherein the curved shape is a semi-circle.

4. The turbomachine of any preceding clause, wherein each of the housing and the damper element are curved in complementary directions to define the curved shape of the cavity, and wherein the damper element curves away from the axis of rotation such that the damper element has a convex curved shape.

5. The turbomachine of any preceding clause, wherein the damping device further comprises a fluid inlet for the ingress of the damping fluid into the cavity, wherein a shape of a cross-section of the damper element is a parabola, and wherein the fluid inlet is defined radially outward of the vertex of the cross-section.

6. The turbomachine of any preceding clause, wherein each of the housing and the damper element are curved in complementary directions to define the curved shape of the cavity, and wherein the damper element curves toward the axis of rotation such that the damper element has a concave curved shape.

7. The turbomachine of any preceding clause, wherein the damping device further comprises a fluid inlet for the ingress of the damping fluid into the cavity, wherein a shape of a cross-section of the damper element is a parabola, and wherein the fluid inlet is defined radially inward of the vertex of the cross-section.

8. The turbomachine of any preceding clause, wherein the damping device further comprises a squeeze arm for uniform distribution of the damping fluid within the cavity.

9. The turbomachine of any preceding clause, wherein the bearing comprises an inner race and an outer race, and wherein the squeeze arm is disposed between the damper element and the outer race.

10. The turbomachine of any preceding clause, wherein the bearing comprises an inner race and an outer race, and wherein the outer race is coupled to the damper element.

11. The turbomachine of any preceding clause, wherein the housing circumferentially surrounds the damper element and the bearing.

12. The turbomachine of any preceding clause, wherein the damping device has a first end and a second end, the second end axially opposite the first end, and wherein the damping device further comprises a first end seal on the first end between the housing and the bearing and a second end seal on the second end between the housing and the bearing.

13. The turbomachine of any preceding clause, wherein the bearing is a ball roller bearing.

14. The turbomachine of any preceding clause, wherein the bearing is a taper roller bearing.

15. The turbomachine of any preceding clause, wherein the bearing is a duplex bearing.

16. A damping device for damping vibration of a shaft rotatable about an axis of rotation, the damping device defining a radial direction and an axial direction, the axial direction parallel to the axis of rotation, the damping device comprising a bearing; a housing; and a damper element, the housing and the damper element defining a cavity therebetween for receipt of a damping fluid, the cavity having a length along the axial direction, wherein the length of the cavity is curved away from the axis of rotation.

17. The damping device of any preceding clause, wherein the length is curved in a plane extending along the radial direction and the axial direction and including the axis of rotation.

18. The damping device of any preceding clause, wherein the bearing comprises an inner race and an outer race, wherein the outer race is coupled to the damper element, wherein the damping device has an upstream end and a downstream end, wherein the damping device further comprises a squeeze arm for uniform distribution of the damping fluid within the cavity, a first end seal on the upstream end between the housing and the bearing, and a second end seal on the downstream end between the housing and the bearing, and wherein the squeeze arm is disposed between the damper element and the outer race.

19. The damping device of any preceding clause, wherein the bearing is a roller bearing.

20. The damping device of any preceding clause, wherein the damping device provides damping in more than one degree of freedom.

21. A method of damping vibration of a shaft, the method comprising rotating the shaft about an axis of rotation; damping, via a damping device, axial vibration of the shaft; and damping, via the damping device, overturning moment of the shaft, wherein the damping device defines a radial direction and an axial direction, the axial direction parallel to the axis of rotation such that the shaft extends longitudinally along the axial direction, wherein the damping device comprises a bearing operatively coupled with the shaft, a housing, and a damper element, the housing and the damper element defining a cavity therebetween for receipt of a damping fluid, the cavity having a curved shape, wherein the cavity is curved in a plane extending along the radial direction and the axial direction and including the axis of rotation.

22. The method of any preceding clause, wherein the housing and the damper element are complementarily curved to define the curved cavity therebetween.

23. The method of any preceding clause, wherein the housing and the damper element each circumferentially surround the bearing.

24. The method of any preceding clause, wherein the damper element is coupled to the bearing.

25. The method of any preceding clause, wherein the cavity is non-cylindrical in shape.

26. The method of any preceding clause, wherein the curved shape is a semi-circle.

27. The method of any preceding clause, wherein the damping fluid assumes the curved shape of the cavity, and wherein damping, via the damping device, axial vibration and overturning moment of the shaft comprises axial and radial squeezing of the curved fluid film.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A turbomachine, comprising:
a shaft rotatable about an axis of rotation; and
a damping device positioned annularly about the shaft, the damping device defining a radial direction and an axial direction, the axial direction parallel to the axis of rotation, the damping device comprising:

a bearing operatively coupled with the shaft;
a housing;
a damper element, the housing and the damper element defining a cavity therebetween for receipt of a damping fluid, the cavity having a curved shape; and
a support arm comprising a horizontal component between the damper element and a portion of the bearing, and a vertical component that extends in the radial direction towards the housing, wherein the support arm is configured to provide uniform distribution of the damping fluid within the cavity,
wherein the shaft extends longitudinally along the axial direction, and
wherein the cavity is curved in a plane extending along the radial direction and the axial direction and including the axis of rotation.

2. The turbomachine of claim 1, wherein a cross-section of the curved shape has a radius of curvature, and wherein the cross-section of the curved shape has a length that is a function of the radius of curvature, the length measured along the curved shape from a first location to a second location, the second location spaced apart from the first location along the axial direction.

3. The turbomachine of claim 1, wherein the curved shape is a semi-circle.

4. The turbomachine of claim 1, wherein each of the housing and the damper element are curved in complementary directions to define the curved shape of the cavity, and wherein the damper element curves away from the axis of rotation such that the damper element has a convex curved shape.

5. The turbomachine of claim 4, wherein the damping device further comprises a fluid inlet for an ingress of the damping fluid into the cavity, wherein a shape of a cross-section of the damper element is a parabola, and wherein the fluid inlet is defined radially outward of the vertex of the cross-section.

6. The turbomachine of claim 1, wherein each of the housing and the damper element are curved in complementary directions to define the curved shape of the cavity, and wherein the damper element curves toward the axis of rotation such that the damper element has a concave curved shape.

7. The turbomachine of claim 6, wherein the damping device further comprises a fluid inlet for an ingress of the damping fluid into the cavity, wherein a shape of a cross-section of the damper element is a parabola, and wherein the fluid inlet is defined radially inward of the vertex of the cross-section.

8. The turbomachine of claim 1, wherein the bearing comprises an inner race and an outer race, and wherein the horizontal component of the support arm is disposed between the damper element and the outer race.

9. The turbomachine of claim 1, wherein the bearing comprises an inner race and an outer race, and wherein the outer race is coupled to the damper element.

10. The turbomachine of claim 1, wherein the housing circumferentially surrounds the damper element and the bearing.

11. The turbomachine of claim 1, wherein the damping device has a first end and a second end, the second end axially opposite the first end, and wherein the damping device further comprises a first end seal on the first end between the housing and the bearing and a second end seal on the second end between the housing and the bearing.

12. The turbomachine of claim 1, wherein the bearing is a ball roller bearing.

13. The turbomachine of claim 1, wherein the bearing is a taper roller bearing.

14. The turbomachine of claim 1, wherein the bearing is a duplex bearing.

15. A damping device for damping vibration of a shaft rotatable about an axis of rotation, the damping device defining a radial direction and an axial direction, the axial direction parallel to the axis of rotation, the damping device comprising:
a bearing;
a housing;
a damper element, the housing and the damper element defining a cavity therebetween for receipt of a damping fluid, the cavity having a length along the axial direction; and
a support arm comprising a horizontal component between the damper element and a portion of the bearing, and a vertical component that extends in the radial direction towards the housing, wherein the support arm is configured to provide uniform distribution of the damping fluid within the cavity,
wherein the length of the cavity is curved away from the axis of rotation.

16. The damping device of claim 15, wherein the length is curved in a plane extending along the radial direction and the axial direction and including the axis of rotation.

17. The damping device of claim 15, wherein the bearing comprises an inner race and an outer race, wherein the outer race is coupled to the damper element, wherein the damping device has an upstream end and a downstream end, wherein the damping device further comprises a first end seal on the upstream end between the housing and the bearing, and a second end seal on the downstream end between the housing and the bearing, and wherein the horizontal component of the support arm is disposed between the damper element and the outer race.

18. The damping device of claim 15, wherein the bearing is a roller bearing.

19. A method of damping vibration of a shaft, the method comprising:
rotating the shaft about an axis of rotation;
damping, via a damping device, axial vibration of the shaft; and
damping, via the damping device, overturning moment of the shaft,
wherein the damping device defines a radial direction and an axial direction, the axial direction parallel to the axis of rotation such that the shaft extends longitudinally along the axial direction,
wherein the damping device comprises a bearing operatively coupled with the shaft, a housing, a damper element, the housing and the damper element defining a cavity therebetween for receipt of a damping fluid, the cavity having a curved shape, and a support arm comprising a horizontal component between the damper element and a portion of the bearing, and a vertical component that extends in the radial direction towards the housing, wherein the support arm is configured to provide uniform distribution of the damping fluid within the cavity,
wherein the cavity is curved in a plane extending along the radial direction and the axial direction and including the axis of rotation.

* * * * *